(12) United States Patent
Wu

(10) Patent No.: US 6,801,973 B2
(45) Date of Patent: Oct. 5, 2004

(54) HOT SWAP CIRCUIT MODULE

(75) Inventor: Chung-Kai Wu, Taoyuan Hsien (TW)

(73) Assignee: Accton Technology Corporation, Hsinchu (TW)

( * ) Notice: Subject to any disclaimer, the term of this patent is extended or adjusted under 35 U.S.C. 154(b) by 387 days.

(21) Appl. No.: 10/128,229

(22) Filed: Apr. 24, 2002

(65) Prior Publication Data

US 2003/0204658 A1 Oct. 30, 2003

(51) Int. Cl.[7] .............................................. G06F 13/00
(52) U.S. Cl. ...................................... 710/301; 710/302
(58) Field of Search .................................. 710/100, 300, 710/301, 302, 303, 304; 361/18, 58; 307/147

(56) References Cited

U.S. PATENT DOCUMENTS

| | | | | |
|---|---|---|---|---|
| 5,272,584 A | * | 12/1993 | Austruy et al. | 361/58 |
| 5,530,302 A | * | 6/1996 | Hamre et al. | 307/147 |
| 5,572,395 A | * | 11/1996 | Rasums et al. | 361/58 |
| 5,787,261 A | * | 7/1998 | Osaka et al. | 710/302 |
| 5,922,060 A | * | 7/1999 | Goodrum | 710/302 |
| 6,041,375 A | * | 3/2000 | Bass et al. | 710/302 |

* cited by examiner

Primary Examiner—Khanh Dang
(74) Attorney, Agent, or Firm—Birch, Stewart, Kolasch & Birch, LLP

(57) ABSTRACT

A hot swap circuit module for a switch system having a backplane. The module includes a circuit board and a latch circuit. The circuit board has a plurality of pins for inserting into the backplane. The latch, disposed on the circuit board, has a data input terminal for receiving an important signal, and a control terminal for receiving a clock signal to latch the important signal. The latch circuit is utilized to eliminate malfunction resulting from the disturbance voltage caused by hot swapping. Any circuit with latch function is allowed to be applied to the switch system of the present invention such that the switch system operates more stably without special pins or additional bus controller.

8 Claims, 4 Drawing Sheets

HOT SWAP CIRCUIT MODULE

BACKGROUND OF THE INVENTION

1. Field of the Invention

The present invention relates to a hot swap circuit module, and particularly to a hot swap circuit module for a switch.

2. Description of the Related Art

Hot swapping is a useful functions for inserting a hard disk drive, an interface card into a system, and removing a device from the system when the system is hot. Hot swapping saves time for shutdown and rebooting. It is very useful in managing and maintaining a network system. There are many logic circuits and interface cards electrically connected together in a typical network system. Were it not for hot swapping, it would take much time to save the status data of the network system to shut down the network system. Similarly, it also takes much time to assert the initial value of the network system. For example, when a switch is shut down to replace a switch module, the network is disconnected for a long time and the transmission efficiency of the network is reduced. Thus, hot swap design is very important in a switch.

In order to reduce the impact of a hot swap, the prior art usually requires additional circuits. FIG. 1a illustrates the disturbance of the bus signal caused by a hot swap. FIG. 1b illustrates a structure of a hot swap bus. A bus 60 is connected to a device 61 through a signal line 63, to a device 62 through a signal line 64, and a device 65 is going to connect to the bus 60. The device 61, 62, and 65 all comprise a driving signal line DRV and receiving signal lines RCV and, there-upon uncharged capacitance loads CLx, Cly, and CLz to ground. When the device 65 is inserted into the connector connected to the bus 60, the bus 60 is instantaneously shorted to ground by a capacitance load CLx, and a disturbance signal 53, which is relative to a quiesced signal level 51, occurs and finally recovers to the quiesced signal level. If the disturbance signal 53 is not processed by a specific circuit, it will result in malfunction. FIG. 2 illustrates a conventional hot swap structure. The conventional hot swap structure is implemented by a separate live insertion bus controller (LIBC) 70, which comprises an interface 71 coupled to a system bus 72, and a system bus controller (SBC) 73. The separate live insertion bus controller 70 can be integrated into the system bus controller 73. The feature card 74, 75, 76, and 77 can be inserted into the connectors of the system bus 72. The live insertion bus controller 70 manages the control of the system bus 72 by a interface 78 and the system bus controller 73.

When a feature card is inserted, the live insertion bus controller 70 acquires accesss to the system bus 72 through the interface 78 with the system bus controller 73. After the access to the system bus 72 has been acquired by the live insertion bus controller 70 and the live insertion bus controller 70 has taken over the control of the system bus 72, the live insertion bus controller 70 drives a subset of the control signal of the system bus 72. The control signal of the system bus 72 is not affected by the disturbance signal resulting from the live insertion. When the live insertion bus controller 70 is informed that the live insertion process has been completed, the system bus controller 73 again acquires control of the system bus 72. The same procedural steps are performed in case of removal of a feature card.

Therefore, a mechanism is needed to define and control the start and end time for the live insertion bus controller 70 to become master of the system bus 72. The feature card 74, 75, 76, and 77 must generate an indicate signal which informs the live insertion bus controller 70 of the state of live insertion of the feature card. The indicate signal is generated by long and short stagger length contact pins for the electrical connection between the feature card and the system bus. As shown in FIG. 3, the feature card 74 comprises the pins 55, 56, and 57. The point of time, when the feature card 74 is about to be inserted or has been completely removed, is indicated by the pin 55. Correspondingly, when the feature card 74 has been completely inserted or is about to be removed, is indicated by the pin 57.

There are some disadvantages in conventional hot swap. First, special pins and connectors are required for detecting insertion or removal of devices. Usually, the device can not comprise special pins and connectors. Second, an additional bus controller is necessary to take over system bus, to build up additional signal path. The hot swap structure is more complex. Therefore, a hot swap structure for general interface is needed.

SUMMARY OF THE INVENTION

It is therefore an object of the present invention to provide a circuit system with a hot swap capability which does not require special pins or circuits and provides stability and efficiency.

To achieve the above objects, the present invention provides a hot swap circuit module. According to the embodiment of the invention, the hot swap circuit module includes a circuit board and a latch.

A hot swap circuit module is used for a circuit system having a backplane. The circuit board has plural pins for inserting into the backplane.

The latch, disposed on the circuit board, has a data input terminal for receiving an important signal, a control terminal for receiving a clock signal for latching the important signal.

When the hot swap circuit module is removed from the backplane or inserted into the backplane, the clock signal does not trigger such that the important signal is not output from an output terminal of the latch. The configuration of the circuit system is not affected by the hot swap action. The hot swap capability allows the replacement or addition of pluggable module without also requiring the circuit system to be powered down. This in turn enhances the continuous availability characteristics of the circuit system by allowing continued operation during service, change, or hardware upgrade operations.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE PREFERRED EMBODIMENT

Figure 1A:
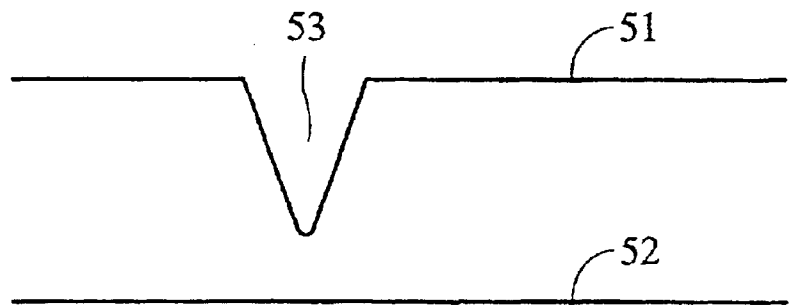
FIG. 1a illustrates the disturbance of a bus signal caused by a hot swap.
Figure 1B:
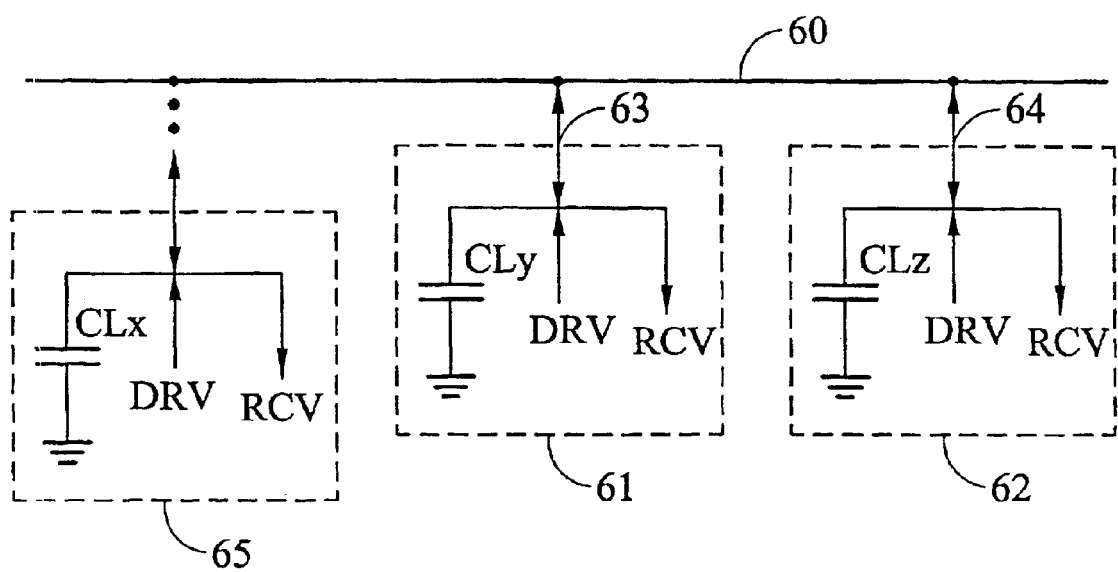
FIG. 1b illustrates a structure of a conventional hot swap bus.
Figure 2:
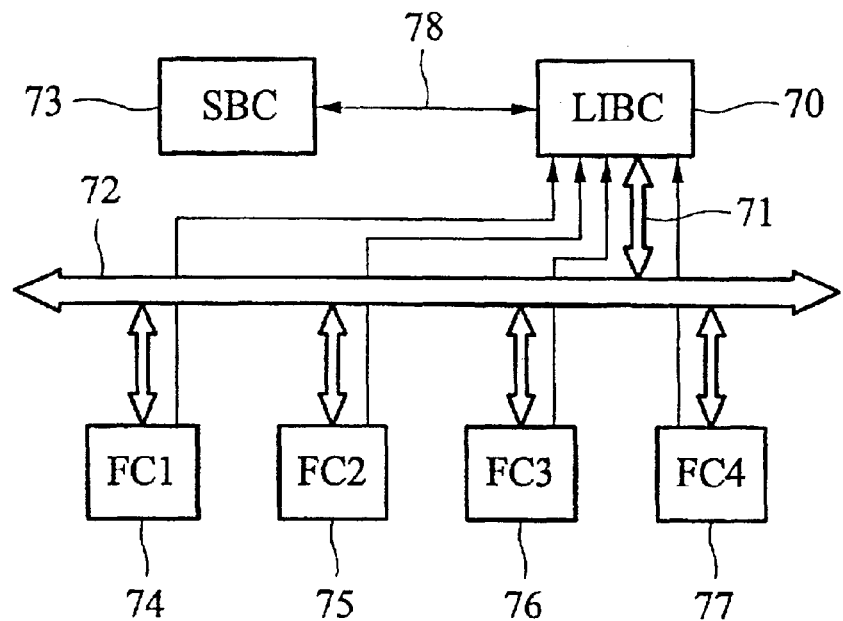
FIG. 2 illustrates a block diagram of a conventional hot swap system.
Figure 3:
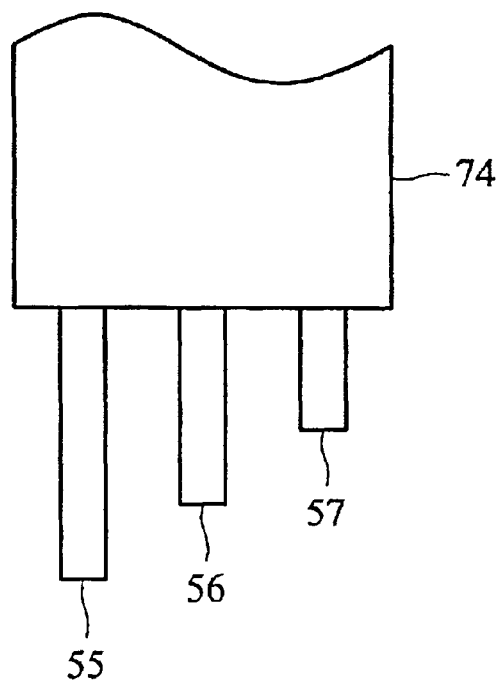
FIG. 3 illustrates a structure of the pins for a conventional hot swap bus.
Figure 4:
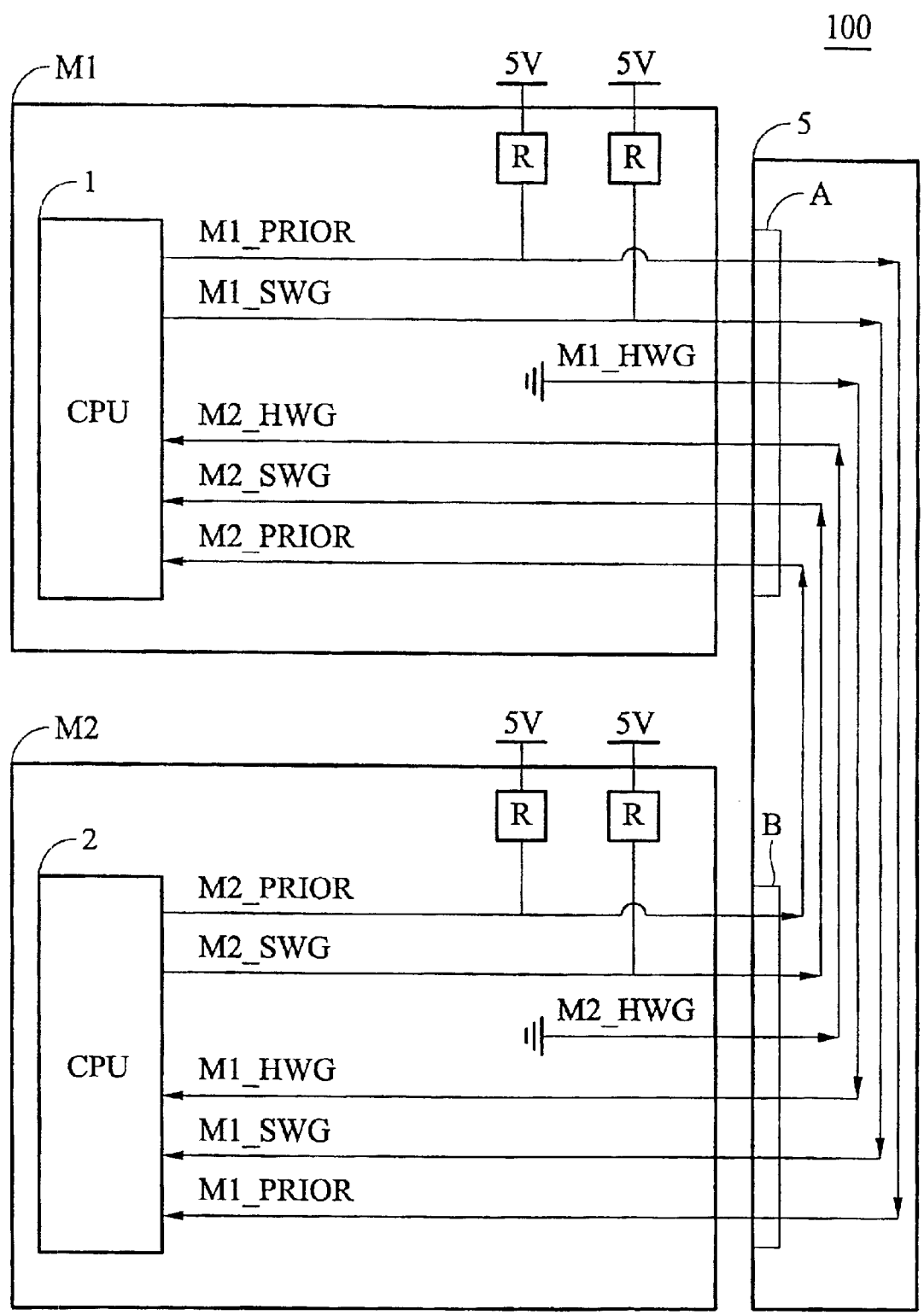
FIG. 4 illustrates a schematic diagram of a redundant switch management of a hot swap switch according to the embodiment of the present invention.

When a switch module or a interface module is replaced in a switch system, hot swap backplane maintains the operation of the switch system without interruption. A switch system in the embodiment of the present invention is implemented in a redundant switch management configuration, thus the switch system comprising two switch management modules installed in a chassis provides seamless flow of management operation. FIG. 4 illustrates the redundant switch management configuration of the switch system in the embodiment of the present invention. The switch system 100 comprises a switch management module M1, a switch management module M2, and a backplane 5. The switch management module M1 comprises a central process unit 1. The switch management module M2 comprises a central process unit 2. The switch management module M1 and M2 performs two functions. First, the switch management module M1 or M2 serves as a central switch fabric. Second, the switch management module M1 or M2 serves as a central management entity. The switch management module M1 or M2 includes a switch circuit. That is, if an interface module receives a packet that is not destined for one of its local ports, the interface module forwards it to the switch management module M1 or M2 for processing. The packet is routed to a correct interface module by the switch management module M1 or M2. The system software resides on the switch management module M1 and M2. The system software is preinstalled on the switch management modules M1 and M2 at manufacture so that the switch management modules M1 and M2 are ready to operate in the switch system 100 after the switch management modules M1 and M2 are physically installed. The switch management modules M1 and M2 exchange information with all modules through a management bus. The switch management modules M1 and M2 use the management bus to send commands to the interface module and to collect information from the interface module.

When the switch system with the switch management modules M1 and M2 installed is powered on, the switch management module M1 in slot A becomes the master switch management module and the switch management module M2 in slot B becomes the slave switch management module. If the switch management module M2 is installed before the switch management module M1 while the switch system 100 is powered on, the switch management M2 becomes the master switch management module. The slave switch management module operates in hot standby mode, which means that it is constantly kept informed of the dynamic state of the management activities that are occurring on the master switch management module. The switch system 100 treats both switch management modules as a single logical device. The master switch management module and the slave switch management module become synchronized after redundancy is established. When any configuration or data is modified on the master switch management module, the configuration or data is automatically modified on the slave switch management module. Thus, if the master switch management module fails for any reason, the slave switch management module immediately takes over all primary functions.

The signals shown in FIG. 4 are defined as follows:

M1_HWG: switch management module M1 hardware good signal (active low)

M2_HWG: switch management module M2 hardware good signal (active low)

M1_SWG: switch management module M1 software good signal (active low)

M2_SWG: switch management module M2 software good signal (active low)

M1_PRIOR: priority signal asserted by switch management module M2 (active low)

M2_PRIOR: priority signal asserted by switch management module M1 (active low)

The power on procedure of the switch system 100 with the switch management modules M1 and M2 installed is illustrated as follows. In step 1, the switch management module M1 detects that the signal M2_HWG is at low level and the signal M2_SWG is at low level. The switch management module M2 detects that the signal M1_HWG is at low level and the signal M1_SWG is at low level. In step 2, the switch management module M1 asserts the signal M1_PRIOR to low level. The switch management module M2 detects that the signal M1_PRIOR is at low level. The switch management module M2 waits for the software of the switch management module M1 to start up. In step 3, the switch management module M1 starts in master mode, serving as a master switch management module. The switch management module M2 starts in slave mode, serving as a slave switch management module.

Figure 5:
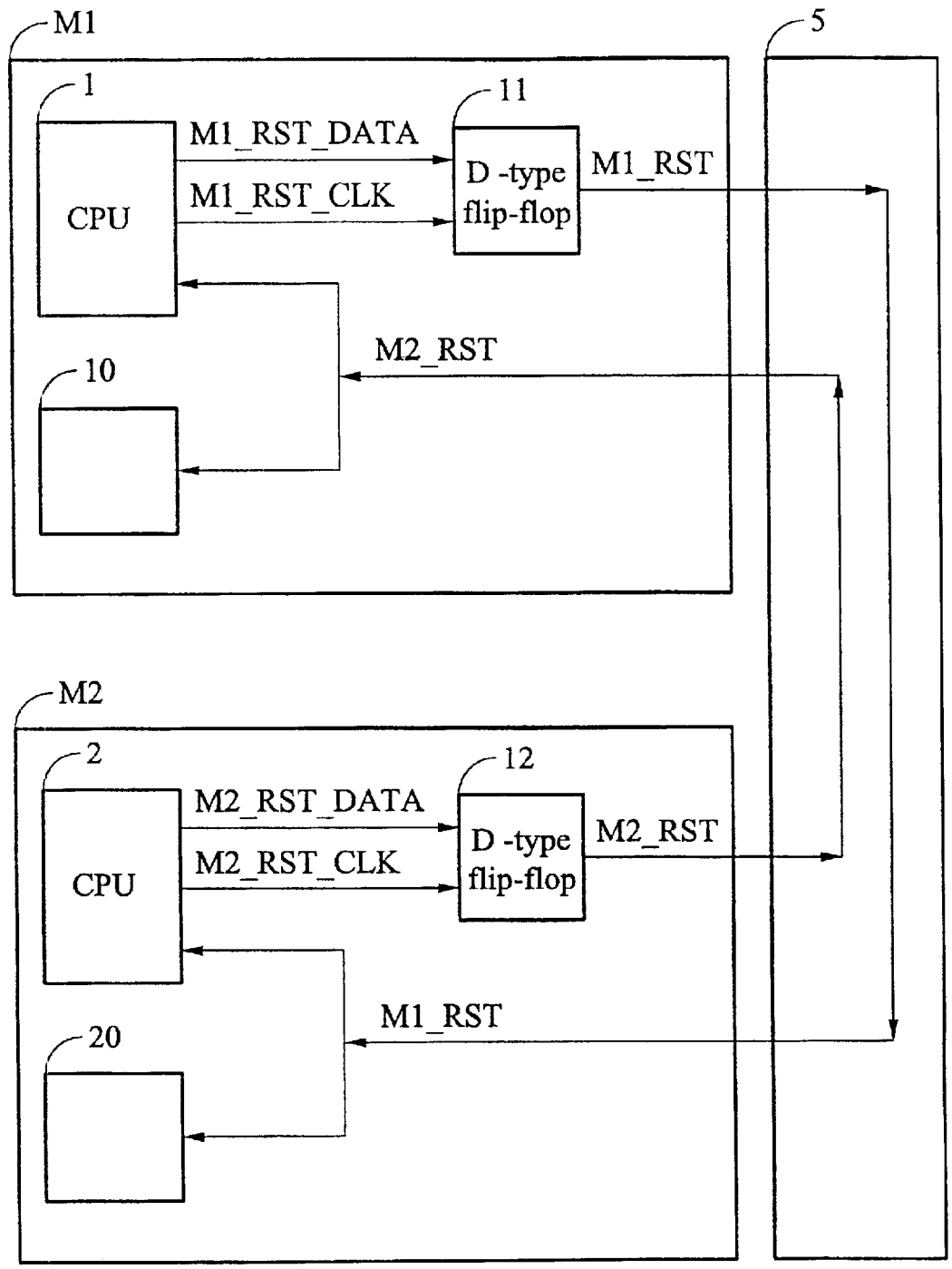
FIG. 5 illustrates a schematic diagram of a hot swap switch according to the embodiment of the present invention.

When the master switch management M1 needs to be released or hangs, caused by programming error, the slave switch management module M2 detects it through watchdog timer and switches over in master mode, and the switch management module M1 go into slave mode. The switchover procedure of the switch management module M1 and M2 is illustrated in FIG. 5. When the master switch management module M1 hangs, the CPU2 (central process unit 2) generates a reset data signal M2_RST_DATA to a data input terminal of a D-type flip-flop 12 and a clock signal M2_RST_CLK to the control terminal of the D-type flip-flop 12, such that the D-type flip-flop 12 outputs a reset signal M2_RST to assert a CPU1 and a switch circuit 10. Then the master switch management module M1 reboots and goes into slave mode.

When the switch management M1 is removed from the backplane 5, a clock signal M1-RST-CLK does not trigger such that a reset signal M1_RST is not generated. The switch management module M2 is still a master switch management module M2.

In the present embodiment, the D-type flip-flop is utilized for latching important signals, so malfunction resulting from the disturbance voltage caused by hot swap is prohibited. Any circuit with the function of latch is allowed to applied to the switch system of the present invention such that the switch system operates more stably without special pins or additional bus controller.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A hot swap circuit module for a circuit system having a backplane comprising:

a circuit board having plural pins for inserting into the backplane; and a latch, disposed on the circuit board, having a data input terminal for receiving a reset data signal, a control terminal for receiving a clock signal, and an output terminal for coupling to one of the plural pins, wherein when the clock signal is triggered and the reset signal is enabled, the output terminal generates an first reset signal.

2. The hot swap circuit module as claimed in claim 1 wherein the circuit system is a switch.

3. The hot swap circuit module as claimed in claim 1 wherein the latch is a D-type flip-flop.

4. The hot swap circuit module as claimed in claim 1 further comprising:

a reset input terminal, coupled to one of the plural pins, for receiving a second reset signal; and a central processing unit, disposed on the circuit board, generating the first reset signal and the clock signal and coupled to the reset input terminal; and a switch circuit, disposed on the circuit board, coupled to the reset input terminal; wherein when the second reset signal is enabled, the central process unit and switch circuit are reset.

5. A hot swap circuit system comprising:

a backplane;

a first circuit board, having first plural pins for inserting into the backplane;

a first circuit, disposed on the first circuit board, generating the first reset signal and receiving a second reset signal;

a first latch, disposed on the first circuit board, having a first data input terminal for receiving a first reset data signal, a first control terminal for receiving a first clock signal, and a first output terminal for coupling to one of the first plural pins, wherein when the first clock signal is triggered and the first reset signal is enabled, the first output terminal generates an first reset signal.

a second circuit board, having second plural pins for inserting into the backplane;

a second circuit, disposed on the second circuit board, generating the second reset signal and receiving a first reset signal;

a second latch, disposed on the second circuit board, having a second data input terminal for receiving a second reset data signal, a second control terminal for receiving a second clock signal, and a second output terminal for coupling to one of the second plural pins, wherein when the second clock signal is triggered and the second reset signal is enabled, the second output terminal generates an second reset signal; wherein when the second reset signal is enabled, the first circuit is reset and when the first reset signal is enabled, the second circuit is reset.

6. The hot swap circuit system as claimed in claim 5 further comprising:

a first switch circuit, disposed on the first circuit board, receiving the second reset signal;

a second switch circuit, disposed on the second circuit board, receiving the first reset signal; wherein when the second reset signal is enabled, the first switch circuit is reset and when the first reset signal is enabled, the second switch circuit is reset.

7. The hot swap circuit module as claimed in claim 5 wherein the first latch is a D-type flip-flop, and the second latch is a D-type flip-flop.

8. The hot swap circuit module as claimed in claim 5 wherein the first circuit is a central process unit, and the second circuit is a central processing unit.

* * * * *